(12) United States Patent
Bonningue (10) Patent No.: US 6,415,961 B2
(45) Date of Patent: Jul. 9, 2002

(54) APPARATUS AND METHOD FOR DISPENSING A PRODUCT

(75) Inventor: Philippe Bonningue, Paris (FR)

(73) Assignee: L'Oreal S.A., Paris (FR)

( * ) Notice: Subject to any disclaimer, the term of this patent is extended or adjusted under 35 U.S.C. 154(b) by 0 days.

(21) Appl. No.: 09/866,832

(22) Filed: May 30, 2001

(30) Foreign Application Priority Data

May 30, 2000 (FR) .............................................. 00 06927

(51) Int. Cl.⁷ ................................................ G01F 11/04
(52) U.S. Cl. ........................ 222/249; 222/205; 222/207; 222/212; 222/492
(58) Field of Search ................................ 222/107, 205, 222/207, 212, 249, 250, 335, 341, 389, 492, 493, 494, 495

(56) References Cited

U.S. PATENT DOCUMENTS

| | | | |
|---|---|---|---|
| 2,534,498 A | * 12/1950 | Broussard .................... | 222/492 |
| 2,904,227 A | 9/1959 | Graham | |
| 3,338,475 A | 8/1967 | Englesson | |
| 4,376,495 A | 3/1983 | Spatz | |
| 4,941,598 A | 7/1990 | Lambelet, Jr. et al. | |
| 5,037,007 A | 8/1991 | Deussen | |
| 5,090,600 A | 2/1992 | Clark | |
| 5,207,666 A | 5/1993 | Idriss et al. | |
| 5,439,143 A | * 8/1995 | Brown et al. ............... | 222/185 |
| 5,636,765 A | 6/1997 | DeJonge | |
| 6,230,940 B1 | * 5/2001 | Manning et al. ......... | 222/185.1 |
| 6,293,437 B1 | * 9/2001 | Socier et al. ............... | 222/212 |

FOREIGN PATENT DOCUMENTS

| | | |
|---|---|---|
| EP | 0 995 976 | 4/2000 |
| FR | 2 578 806 | 9/1986 |
| WO | WO 92/10727 | 6/1992 |

OTHER PUBLICATIONS

Co-pending Application—Attorney Docket No. 05725.0888–00000 Title: Apparatus and Method for Dosing a Product Inventor(s): Philippe Bonningue U. S. Filing Date: May 21, 2001.

English language Derwent Abstract of EP 0 995 976, Apr. 26, 2000.

English language Derwent Abstract of FR 2 578 806, Sep. 19, 1986.

* cited by examiner

*Primary Examiner*—Henry C. Yuen
*Assistant Examiner*—Melvin Cartagena
(74) *Attorney, Agent, or Firm*—Finnegan, Henderson, Farabow, Garrett & Dunner, L.L.P.

(57) ABSTRACT

A dispensing member for a container may comprise a piston configured to slide between a first position and a second position inside the body of the dispensing member in response to pressure of a product exerted on the piston. A variable volume chamber may be at least partially defined by the piston and configured to communicate with a container. The first position of the piston may maximize a volume of the variable volume chamber, and the second position of the piston may minimize the volume of the variable volume chamber. A difference between the maximum volume and the minimum volume may comprise a first volume. The dispensing member may also include an outlet for passing product from the variable volume chamber as the piston moves from the first position to the second position. The dispensing member may be configured to dispense a first amount of product up to the first volume and, depending on a manner in which pressure of a product is exerted on the piston, a second amount of product.

105 Claims, 4 Drawing Sheets

APPARATUS AND METHOD FOR DISPENSING A PRODUCT

The present invention relates to an apparatus for dispensing doses of fluid product, such as, for example, doses of a predetermined volume of a cosmetic product such as a shampoo, a conditioner, a gel, a lotion, a milk, etc. The invention also relates to a device including the apparatus and a container. The invention further relates to a method of dosing a product.

In the cosmetics field, a good number of haircare products, particularly shampoos, are packaged in a container having deformable walls and a neck which is closed off by a wall having a center portion having one or more small holes for expulsion of the product. In order to dispense the product, the container is turned upside down. Pressure exerted on the deformable walls of the container allows the product to be forced out through the hole or holes. The product is collected in the user's palm and applied to his or her hair. However, this simple operation does not allow the amount of product dispensed to be dosed.

Of course, there are devices for dosing a product to be dispensed, but many of these devices have a complexity such that their cost is completely inconsistent with the economic requirements of certain distribution channels, in particular the mass market.

Some devices use a dosing arrangement of the type which includes a dosing chamber formed inside a movable member having a free end provided with openings capable of allowing dosed expulsion of the product. The openings in the dosing chamber are exposed by means of pressure exerted by the product on one face of the member. The product then flows under gravity when the openings are exposed. During expulsion of the product, the moveable member emerges substantially outside the dosing chamber. Such an arrangement is particularly appropriate for the dosed dispensing of very liquid products, such as drinks. Such a system cannot easily be used for dispensing viscous products, such as those normally used especially in the cosmetics field. This is because the viscosity of these products does not allow the dose of product to flow at a sufficient pace merely under the effect of its own weight.

Some other devices use a dosing arrangement comprising a dosing chamber inside which a piston is slideably fitted. An axial channel passes through a stem attached to the piston and terminates near the free end of the stem in a radial portion which emerges in an outlet. In the rest position, the outlet is closed off. In order to dispense a dose of product, the outlet is exposed due to the pressure of the product being exerted on the piston. The product flows through a radial portion of the channel, passes into the axial part of the channel and leaves through the radial outlet. Since the product necessarily passes through this axial channel made inside the stem, the device is particularly unsuitable for high flow rates, particularly in the case of products having a high viscosity. In addition, such an axial channel is subject to clogging, particularly when the product has not been used for a long period of time, possibly making the device completely unusable. Finally, localized dispensing of the product into the palm of the hand is one of the most difficult operations to carry out successfully.

Other dosing devices present a number of problems. Among these problems are, in particular, the relatively large number of parts, the complexity which results therefrom, the cost, the difficulty of use, problems of sealing, the problem of dispensing a precise dose, etc.

The invention optionally overcomes one or more limitations of the related art described above. Certain aspects of the invention could be practiced without necessarily obviating one or more of these limitations.

According to a first aspect of the invention, a dispensing member may be associated with a container containing a product. The dispensing member may comprise a variable volume chamber having a piston slideably guided inside the body of the dispensing member. The piston may be capable, in response to pressure exerted by the product, of moving between a first position in which the chamber has a maximum volume and a second position in which the chamber has a minimum volume. The movement of the piston may dispense a volume of product through at least one outlet. The outlet may be closed off when the piston is in the first and second positions. The chamber may be capable of communicating with the container such that the volume of product dispensed in response to the movement has a fixed component corresponding to the difference between the maximum volume and the minimum volume and a variable component (e.g., continuous component) linked to the conditions of exertion of the pressure by the product on the piston.

The volume of product dispensed in response to the movement may have a fixed component and a variable component because of an optional permanent communication between the variable volume chamber and the container during substantially the entire movement of the piston between the first and second positions.

The variable component corresponds to the amount of product passing from the container towards the variable volume chamber before the piston reaches the second position. At least when the piston moves from the first to the second position and when it returns from the second to the first position, the variable volume chamber may be in communication with the container.

Throughout the present application, "conditions of exertion of pressure" generally refers to the value of the pressure exerted and of the duration for which this pressure is exerted. For example, a high amount of pressure applied for a short duration will cause the dispensing of a dose having essentially a fixed component. This is because a high pressure applied suddenly may cause the rapid passage of the piston into the position in which the outlet is closed off, thus limiting the volume of product able to pass continuously from the container towards the variable volume chamber.

Conversely, pressure of lower value applied for a longer period may cause the dispensing of a dose with a large variable component, for example. This is because, to a degree, such a moderate force may not be sufficient to cause the piston to pass into the position in which the outlet is closed off. Therefore, dispensing may carry on continuously until the container is substantially empty.

In one exemplary embodiment, the product may be pressurized inside the container by a container having one or more deformable walls. In response to pressure exerted substantially perpendicularly to the external surface of the walls, the walls may deform elastically so as to reduce the volume of the container, and correspondingly to pressurize the product inside the container. When the pressure on the walls ceases, they may resume their initial shape.

In use, pressure may be exerted on the walls of the container with substantially the same intensity and for substantially the same duration. Different users might exert differing amounts of pressure on the walls for differing durations, thereby causing the dispensed dose to vary from one user to another. Each user might be capable of dispensing a dose which is substantially identical upon each use by maintaining the same conditions of exertion of the force on the walls of the container. This is because the variable component may be substantially identical from one use to another when the conditions of exercising of the fore are substantially identical.

If, during a particular use, the user needs to dispense a larger dose, for example, in the case of shampoo where the hair is particularly dirty, the user may modify the conditions of exertion of the force in order to modify the correspondingly dispensed volume.

The dispensed volume may be independent of the degree of emptying of the container. The variable volume chamber forms a buffer which may be filled substantially completely each time the piston returns from the second position to the first position, irrespective of the level of product remaining in the container.

Alternatively, the product may be pressurized by means of a piston slideably mounted inside a cylindrical container or by any other equivalent means.

The degree of closing off of the outlet or outlets when the piston occupies the first and second positions optionally depends to a large extent on the viscosity of the product. For example, when a container equipped with a dispensing member according to an optional embodiment of the invention is turned upside down, the product may not flow under the effect of its own weight via the outlet or outlets. In one optional embodiment, where a highly viscous product is dispersed through an outlet of appropriate size, there might be no additional structure for closing off the outlet since the viscosity of the product will to a certain extent assist closing-off of the outlet. In the case of less viscous compositions, structure might be provided for closure of the outlet. The means ensuring closure of the outlet when the piston is in the first position may be identical to or different from the means for providing the closure of the outlet when the piston is in the second position.

Closing off of the outlet may be provided by any means arranged in the outlet or in the vicinity of the outlet so as to close it off. Alternatively, any means capable of isolating the outlet from the product contained in the container may be employed.

Optionally, the piston may define at least one passage providing permanent communication between the container and the variable volume chamber. When the piston passes from the first position to the second position, the at least one passage may allow the flow of a volume of product into the variable volume chamber, corresponding to the variable component of the dose. When the piston returns to the first position, the at least one passage may allow immediate filling of the variable volume chamber.

According to one embodiment, at least one peripheral passage may be defined by a peripheral edge of the piston in cooperation with an inner surface of the body of the chamber. According to another embodiment, three peripheral passages may be arranged uniformly spaced about the peripheral edge of the piston and separated by three corresponding portions for guiding the piston.

According to yet another embodiment, the piston may comprise at least one passage extending through the piston. The at least one passage may extend from a first side of the piston facing the container to a second face, opposite the first one, facing the variable volume chamber.

According to still another embodiment, the piston may comprise a plurality of passages extending through the piston and spaced, for example, in a uniform manner over the surface of the piston. According to one exemplary embodiment, three holes having a diameter of, for example, from 2 mm to 2.5 mm may be spaced in a uniform manner close to the peripheral edge of the piston.

It should be appreciated that the number and configuration of the optional passages, e.g., holes, providing permanent communication between the container and the variable volume chamber may depend to a large extent on the viscosity of the product and on the maximum value sought for the variable component of the dose dispensed. The greater the total section of the passages, the greater may be the variable component of the dose.

According to another embodiment, the piston may be configured such that, when it is in the second position, it may isolate the outlet of the variable volume chamber. The piston may, on the side facing towards the outlet, have a groove engaging with the free edge of an axial skirt formed around the outlet engages when the piston is in the second position.

According to yet another embodiment, elastic return means, for example, a helical spring, may be configured such that, when the pressure of the product on the piston ceases, the piston may be returned elastically into the first position. Such a helical spring, when its turns or coils are contiguous, for example, in the second position of the piston, may act as member for closing the outlet of the variable volume chamber.

According to another embodiment, the outlet of the variable volume chamber may be formed in an end wall of the body of the dispensing member. The outlet may be arranged facing the piston and at a distance from the piston when the piston is in the second position.

An additional option may include an elastically deformable membrane arranged at the dispensing hole. The membrane may include at least one slot, with the slot being closed in the absence of pressure inside the dispensing member and capable of opening in response to pressure exerted by the product contained in the variable volume chamber. The membrane may enhance closure of the outlet while the piston is in the first position. The membrane may be fastened around the dispensing hole, for example, by glueing, snap-fitting, welding, etc. Such a membrane may make it possible to keep the dispensing hole in a satisfactorily clean condition and allow the flow of product to be interrupted instantaneously.

Again, the degree of closure of the slot may depend to a large extent on the viscosity of the product. As a function of the viscosity of the product, the edges which delimit the slot may be more or less contiguous and sufficiently close to retain the product inside the dispensing member, for example, when a container equipped with such a dispensing member may be turned upside down.

Optionally, the membrane may be capable, in response to pressure exerted by the product being expelled from the outlet of the variable volume chamber, of occupying a convex profile facing towards the outside of the dispensing member and, due to a suction phenomenon when the walls of a container return to their original shape and the piston returns from the second position to the first, of returning to a convex profile facing towards the inside of the container. During this return of the membrane towards the inside of the dispensing member, an intake of air towards the container may take place. This is because the return of the membrane may confer on the slot an orientation capable of allowing the intake of air inside the dispensing member and of preventing any inconvenient expulsion of product.

Such a membrane may be produced from a material chosen from thermoplastic or crosslinked elastomers, for example, silicones, natural or synthetic latexes, EPDMs, polyurethanes, mixtures of polypropylene and of SBS, SEBS or EPDM, very-low-density polyethylenes, mixtures based on polyester glycols (TPU) or polyether glycols (PEBA and COPE), and flexible polyvinyl chlorides (PVC).

According to a further optional aspect, an assembly may be provided for the packaging and dosed dispensing of a product, such as a cosmetic product. The assembly may comprise a container formed from a body having one end closed by a-base, and another end forming a neck having a free edge delimiting an opening. A dispensing member may be fitted securely onto the neck such that the assembly may be used, for example, while being held upside down. The container may have the form of a tube or of a bottle. The cross-section of the container may be of any type, for example, oval, elliptical or circular. A cap may be provided to removably cover the dispensing member, for example, in a storage position. The dispensing member may be mounted substantially parallel to and along the axis of the container. However, this is not a necessary characteristic. In certain cases, it may be desirable to fit the dispensing member at an angle with respect to the axis of the container, in order to enhance the rate of emptying of the container.

The body of the container may have one or more walls capable of being squashed when pressure is exerted on the container in a direction substantially perpendicular to the wall(s), and of returning to their initial shape when the pressure ceases.

Other mechanisms, for example a piston, could be envisaged for pressurizing the product with a view to forcing its expulsion through the dispensing member.

Such an assembly may be particularly suited to, but not limited to, the packaging and dosed dispensing of a cosmetic product, for example a shampoo, a conditioner, a hair gel, or a beauty-care cream or milk.

According to one aspect of the invention, a dispensing member for a container may comprise a piston configured to slide between a first position and a second position inside the body of the dispensing member in response to pressure of a product exerted on the piston. A variable volume chamber may be at least partially defined by the piston and configured to communicate with a container. The first position of the piston may maximize a volume of the variable volume chamber, and the second position of the piston may minimize the volume of the variable volume chamber. A difference between the maximum volume and the minimum volume may comprise a first volume. The dispensing member may also include an outlet for passing product from the variable volume chamber as the piston moves from the first position to the second position. The dispensing member may be configured to dispense a first amount of product up to the first volume and, depending on a manner in which pressure of a product is exerted on the piston, a second amount of product.

According to yet another aspect of the invention, a method of dispensing a product may comprise providing an apparatus comprising a variable volume chamber defined, at least in part, by a movable piston and flowing a product from a reservoir into the variable volume chamber. The piston may be moved, in response to pressure of the product, from a first position maximizing a volume of the variable volume chamber to a second position minimizing the volume of the variable volume chamber. A difference between the maximum volume and the minimum volume may comprise a first volume. Product may be passed from the variable volume chamber via an outlet. Passing the product may comprise passing a first amount of product up to the first volume and, dependent on a manner in which pressure of a product is exerted on the piston, a second amount of product.

The method may further comprise squeezing the reservoir to increase pressure of the product. The opening may comprise changing a profile of a membrane associated with the outlet, in response to pressure of the product, from a convex profile facing towards an outside of the variable volume chamber to a convex profile facing towards the inside of the variable volume chamber.

According to another aspect of the invention, a dispensing member for a container may comprise a body, a piston configured to slide inside the body, and a variable volume chamber at least partially defined by the piston. The piston may be movable between a first position and a second position. The first position of the piston may maximize a volume of the variable volume chamber, and the second position of the piston may minimize the volume of the variable volume chamber. The piston may be configured to provide constant communication between the variable volume chamber and a container while moving from the first position to the second position. An outlet may pass product from the variable volume chamber while the piston moves from the first position to the second position.

According to yet another aspect of the invention, a dispensing member may comprise a body and a piston configured to slide inside the body. The piston may be movable between a first position and a second position. The dispensing member may also include a variable volume chamber at least partially defined by the piston. The variable volume chamber may be configured to communicate with a container. The first position of the piston may maximize a volume of the variable volume chamber, and the second position of the piston may minimize the volume of the variable volume chamber. An outlet for passing product from the variable volume chamber may be associated with a valving member. The valving member may be configured to close off the outlet while the piston is in the first position. A sealing member may be associated with the outlet, and the piston may be configured to engage the sealing member and close off the outlet while in the second position.

According to another aspect of the invention, a dispensing member for a container may comprise a piston configured to slide between a first position and a second position inside the body of the dispensing member in response to pressure of a product exerted on the piston. A variable volume chamber may be at least partially defined by the piston and configured to communicate with a container. The first position of the piston may maximize a volume of the variable volume chamber, and the second position of the piston may minimize the volume of the variable volume chamber. A difference between the maximum volume and the minimum volume may comprise a first volume. The dispensing member may also include an outlet for passing product from the variable volume chamber as the piston moves from the first position to the second position. The dispensing member may be configured to dispense an amount of product greater than the first volume.

According to another aspect of the invention, a dispensing device may comprise a container associated with an embodiment of a dispensing member according to the invention. The dispensing device may include a container body having one end closed by a base and another end forming a neck. A free edge of the neck may delimit an opening, and the dispensing member may be fitted securely onto the neck.

According to one embodiment, the dispensing device may include a container comprising at least one wall capable of being squeezed when squeezing pressure is exerted on the container and of returning to an initial shape when the squeezing pressure ceases. The dispensing device may further comprise a cosmetic product contained in the container, for example, a shampoo, a conditioner, a hair gel, a beauty-care cream, or beauty-care milk.

According a further aspect of the invention, a method of dispensing and applying a cosmetic product may comprise providing an embodiment of a dispensing device in accordance with the invention, dispensing cosmetic product from the device, and applying the cosmetic product to the skin and/or hair. The dispensing may comprise passing the cosmetic product through the outlet of the dispensing device.

Aside from the structural and procedural arrangement set forth above, the invention could include a number of other arrangements, such as those explained hereinafter. It is to be understood that both the foregoing description and the following description are exemplary.

The accompanying drawings are included to provide a further understanding of certain aspects and are incorporated in and constitute a part of this specification. The drawings illustrate an optional embodiment and, together with the description, serve to explain certain principles.

In the drawings.

Reference will now be made in detail to an optional embodiment of the invention, an example of which is illustrated in the drawings. Wherever possible, the same reference numerals are used in the drawings and specification to refer to the same parts.

Figure 2:
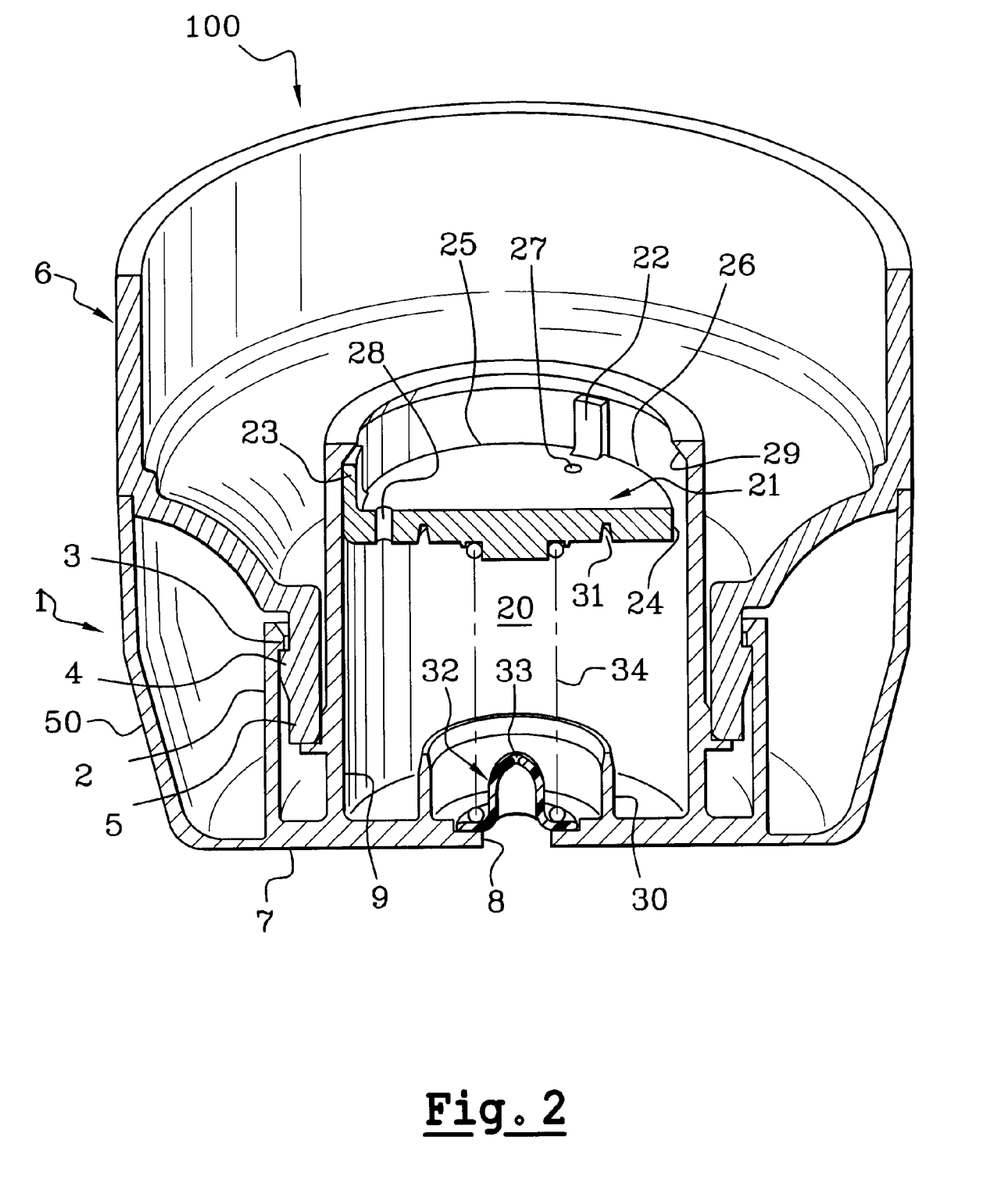
FIG. 2 is an axial cross-sectional view of an embodiment of the dispensing member of FIGS. 1A and 1B.

In accordance with the present invention, a dispensing member is provided. As shown in FIG. 2, a dispensing member, for example, a nozzle, may comprise a sheathing skirt 50 and a catching skirt 2. An inner surface of the catching skirt may comprise a bead 3 capable of interacting, for example, by snap-fitting with a corresponding bead 4 formed on the outer surface of a neck 5 of a container 6 (shown upside down). The container 6 may include, for example, a bottle with deformable walls. It should be appreciated that other mechanisms could be used for fitting the dispensing member 1 on the container 6, for example, screwing, gluing, welding, etc. Alternatively, at least a portion of the dispersing member could be integrally formed as part of the container.

One end of the catching skirt 2 and the sheathing skirt 50 may be closed by a transverse wall 7 having an outlet 8. The outlet 8 may be positioned at a center of the transverse wall 7. The dispensing member 1 may also comprise a skirt 9, of axis X, concentric with the lateral skirt 2, and having a diameter that is slightly smaller than the internal diameter of the neck 5 so as to be inserted in a tight-fitting manner inside the neck. A sealing lip (not shown) may improve the seal while the dispensing member 1 is fitted onto the container 6.

A variable volume chamber 20 may comprise a cylindrical body including the skirt 9, inside which a piston 21 may be slideably guided. The peripheral edge 24 of the piston 21 may have a plurality of uniformly-spaced ribs 22, 23 delimiting, in combination with the peripheral edge 24 of the piston 21 and the inner surface of the skirt 9, a plurality of peripheral passages 25, 26. The ribs 22 and 23 may guide the piston 21 during its sliding movement in the cylindrical body 9. Accordingly to one exemplary embodiment, the piston may include three such ribs. The ribs may delimit three peripheral passages having a radial width of, for example, approximately 1 mm.

Moreover, the piston may include a plurality of through holes 27, 28 extending from the side of the variable volume chamber 20 facing the transverse wall 7 to the side facing towards the container 6. According to one exemplary embodiment, three uniformly-spaced holes may be made close to the periphery of the piston and may have a diameter of, for example, approximately 2.2 mm.

The movement of the piston inside the cylindrical body 9 may be limited at one end by the presence of a bead 29 formed on the inner surface of the skirt 9, close to the free end thereof. The movement of the piston may be limited at a second, opposite end by a skirt 30 surrounding the outlet 8. A free edge of the skirt 30 may be configured for sealed insertion inside an annular groove 31 formed on a surface of the piston facing the outlet 8.

In the absence of pressure exerted by the product on the container side of the piston 21, the piston 21 may be urged by a helical spring 34 to abut against the bead 29. One end of the helical spring 34 may abut on the inner surface of the end wall 7 and the other end of the spring 34 may abut against the piston 21.

A valving member, for example, elastomeric membrane 32, may be associated with the dispensing hole 8. Such a membrane may, for example, be glued, snap-fitted, or welded around the dispensing hole 8. The membrane 32 may include at least one slot 33. The slot 33 may be closed in the absence of pressure inside the dispensing member and capable of opening in response to pressure exerted by the product contained inside the variable volume chamber 20.

Figure 3A:
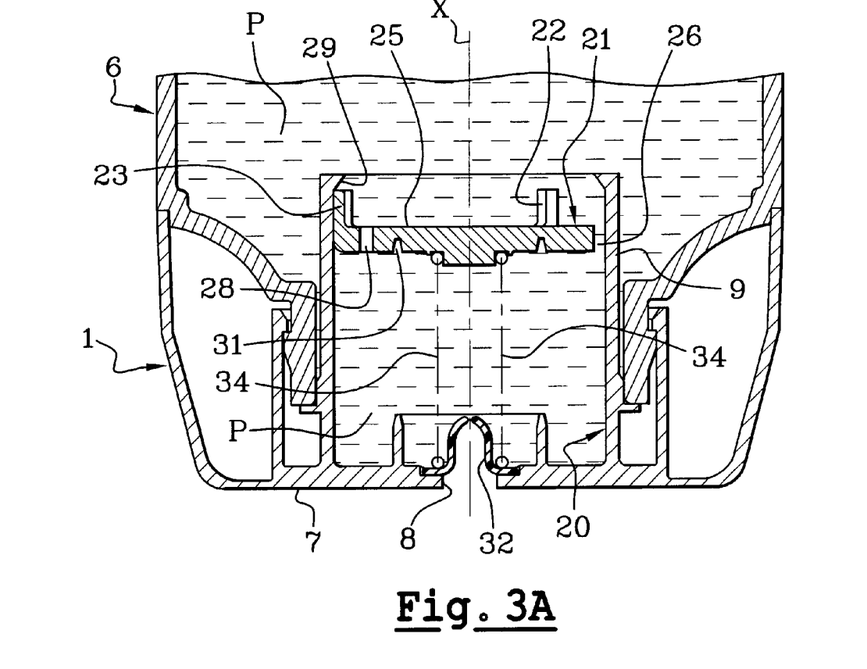
FIGS. 3A–3D illustrate different stages in the operation of the dispensing member of FIG. 2.
Figure 3B:
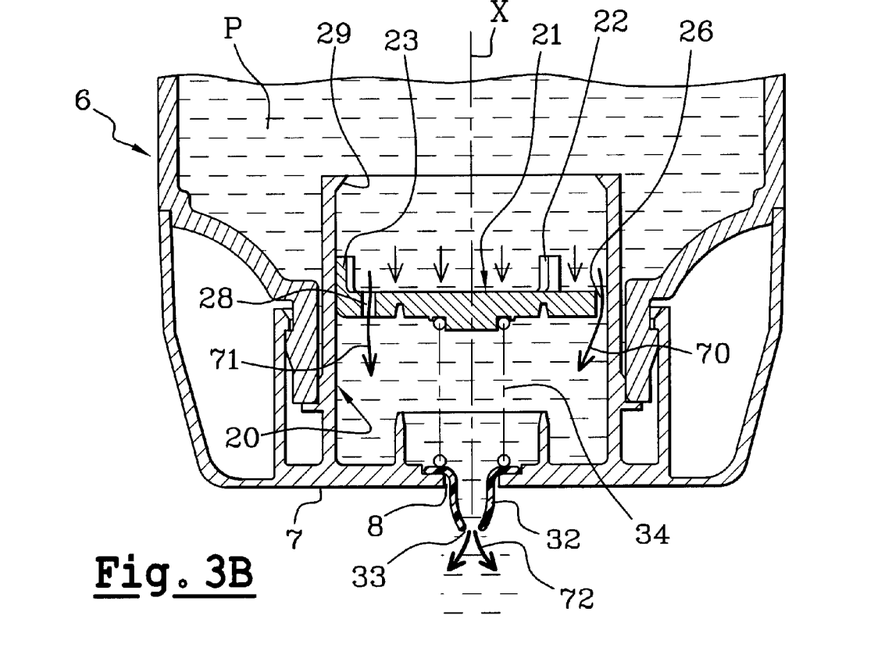
Figure 3C:
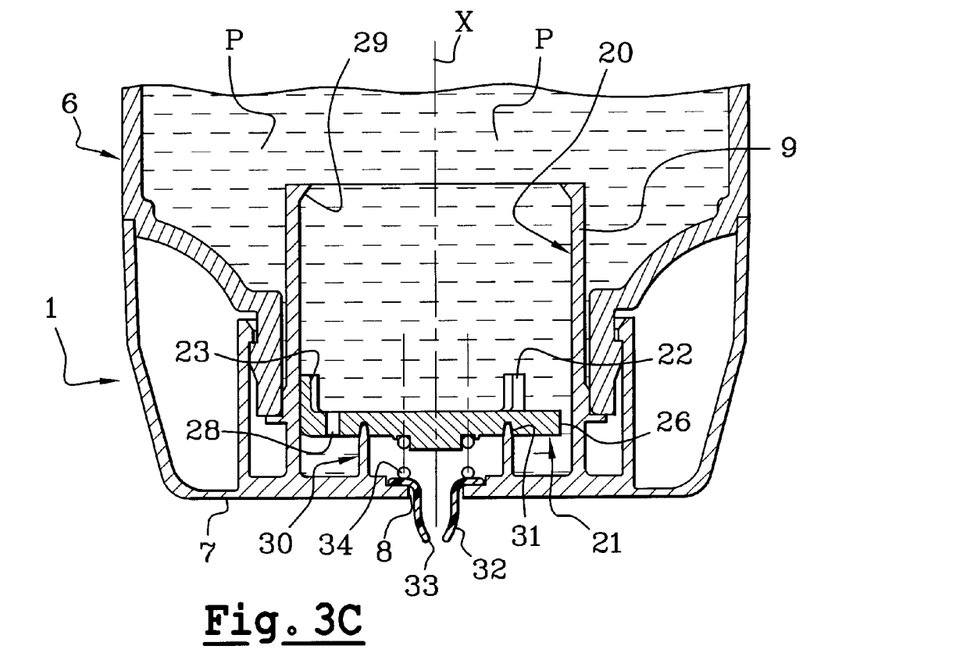

The membrane 32 may be configured as a teat, or nipple, such that in response to pressure exerted by the product contained in the variable volume chamber 20, it has a convex profile facing towards the outside of the dispensing member (see FIGS. 3B and 3C). Due to suction caused by negative pressure in the variable volume chamber 20 when the piston 21 moves away from the membrane 32, the walls of the membrane 32 resume their non-deformed position and the membrane 32 returns to a convex profile facing towards the inside of the container 6, as shown in FIG. 2 and in FIGS. 3A and 3D.

The piston 21 may move axially between a first position and a second position. For convenience purposes, these positions may be referred to as a high position and a low position. It should be understood, however, that when the device is arranged in an orientation different from that shown in the drawings, these relative height designations might not apply. In the high position, the piston 21 may abut against the bead 29. In this position, the outlet 8 of the variable volume chamber may be closed in a sealed manner against the product by the teat 32. In the low position, the groove 31 of the piston 21 may engage with the free edge of the skirt 30, thus isolating the dispensing hole 8 of the variable volume chamber 20.

Although not shown, it is possible to provide apertures in the cylindrical skirt 9, for example, close to its upper part, so as to allow one or more flows of product from the container 6 towards the variable volume chamber 20, in a direction other than the axial direction.

Figure 1A:
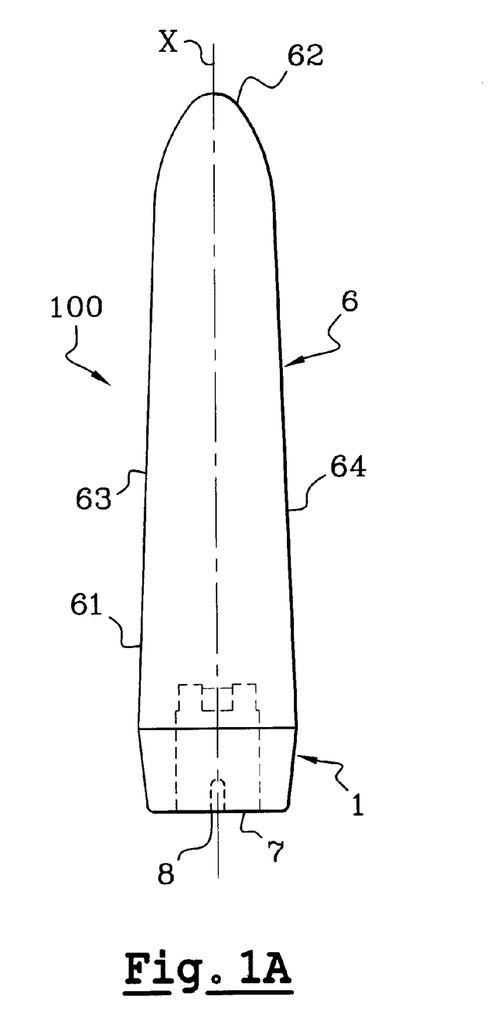
FIG. 1A is a side view of a container, in a rest position, equipped with a dispensing member according to an embodiment of the invention.
Figure 1B:
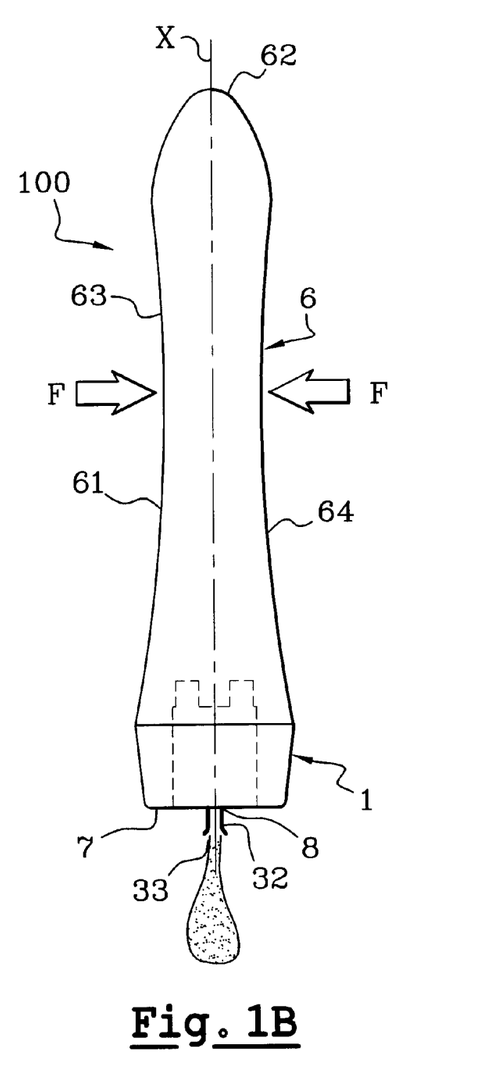
FIG. 1B is a side view of the container of FIG. 1B, in a dispensing position.

As shown in FIGS. 1A and 1B, the assembly 100, on which a dispensing member 1 according to the invention may be fitted, may include a bottle 6, made, for example, from polyethylene or polypropylene. The bottle 6 may include a body 61 closed by a base 62. The body may have an elongate transverse section formed from two side faces 63, 64, which can be deformed "elastically" under the effect of pressure F exerted, in the manner illustrated in FIG. 1B, perpendicularly to the sides 63, 64 of the bottle 6. In the dispensing position illustrated in FIG. 1B, in response to pressure F exerted on the walls of the bottle perpendicularly to the large faces thereof, the product P may be dispensed in an essentially axial flow through the slot 33 provided in the membrane 32 arranged inside the outlet 8 traversing the end wall 7. During dispensing, nothing emerges substantially beyond the end wall 7 except for the membrane 32.

FIGS. 1A–1B and 3A–3D, to which reference is now made, illustrate an exemplary operation of an embodiment of a dispensing member. Referring to FIG. 3A, in the rest position, the container 6 may be placed upside down on a flat surface. In this position, the outlet 8 of the variable volume chamber 20 may be closed off by the teat 32. The piston 21, urged by the spring 34 in a direction away from the outlet, abuts against the bead 29 formed at the skirt 9. The peripheral passages 25, 26 and the holes 27, 28 may provide permanent communication between the container 6 and the variable volume chamber 20. The variable volume chamber 20 may be substantially filled from the return of the piston 21 to the rest position from most recent use of the device. FIG. 1A illustrates a rest position of a container including an embodiment of the dispensing member.

Referring to FIG. 3B, pressure may be exerted on the lateral walls of the container while container 6 is held upside down, for example, by one hand. A product P under pressure in the container 6, on the one hand, pushes the piston 21 towards the outlet 8 and, on the other hand, passes continuously to the inside of the variable volume chamber 20 via the passages 25, 26 and holes 27, 28 as the volume of the chamber 20 diminishes. The continuous flow of product towards the variable volume chamber 20 is illustrated by the arrows 70 and 71. The pressurized product P in the variable volume chamber 20 may also give rise to the movement of the "teat" 32 towards the outside of the dispensing member and the expulsion of the product in a localized manner (arrow 72) via the slot 33 traversing the membrane 32. FIG. 1B illustrates a dispensing position of a container including an embodiment of the dispensing member.

Referring to FIG. 3C, the product may be dispensed until the piston 21 bears against the skirt 30 of the variable volume chamber 20. At this point, the spring 34 may be considerably compressed and the chamber may be substantially empty, except for the volume located below the free edge of the skirt 30. The volume below the free edge of the skirt 30 may be made as small as possible by suitably choosing the configuration of the piston 21 and of the skirt 30.

The amount of product dispensed may be a function of the way in which the user pressurizes the walls of the container. However, under identical pressurization conditions that are specific to each user, the amount of product dispensed may be substantially the same, for example, plus or minus approximately 20%. On the other hand, by modifying the conditions of pressurizing on the walls of the container, for example, by pressing more gently for a longer period as opposed to a short, high pressure, the dose dispensed may be greater due to the greater amount of product which may have passed continuously from the chamber 6 towards the chamber 20 before the piston 21 bears on the skirt 30.

Figure 3D:
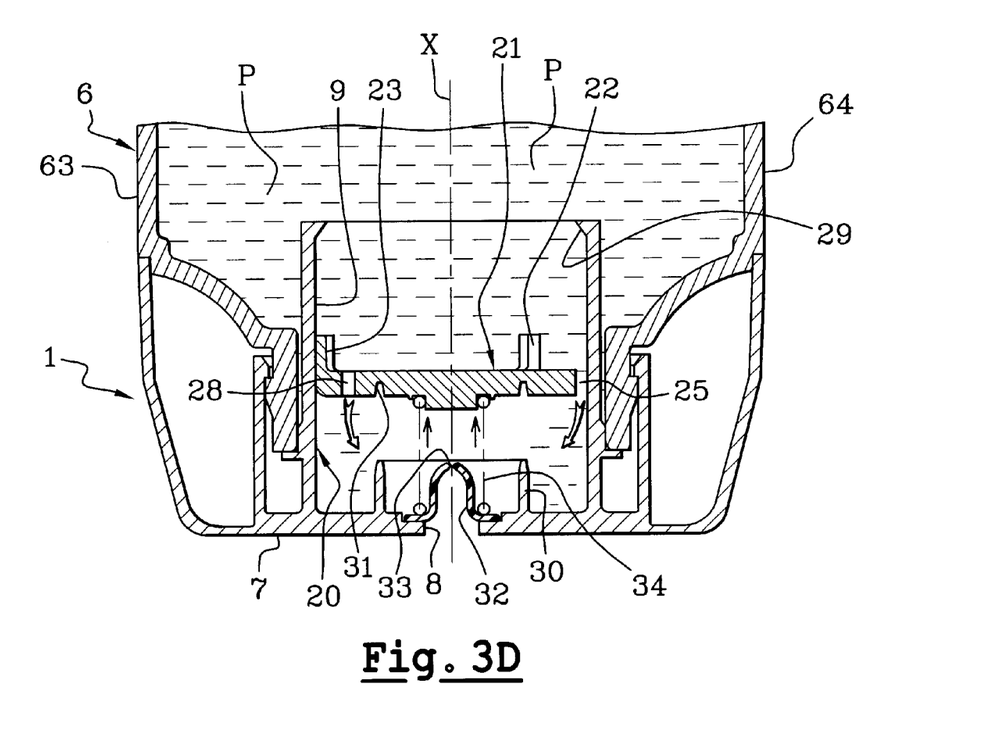

Referring to FIG. 3D, after having relaxed the pressure exerted on the walls 63, 64 of the container 6, the walls 63, 64 may return to their initial position. Through the action of the return force of the spring 34, the piston 21 may rise in the direction away from the end wall 7 toward a rest position. Under the pressure of the piston rising to the rest position, the product located on the side of the piston 21 facing towards the container may flow into the variable volume chamber 20 via the passages 25, 26 and holes 27, 28. When the piston 21 abuts against the bead 29, the movement of the piston 21 may stop and the variable volume chamber may be substantially full. While the piston 21 rises, the reduced pressure prevailing inside the container and inside the variable volume chamber 20 may assist the return of the "teat" 32 towards the inside of the dispensing member 1 and an intake of air via the slot or slots 33 which traverse it. The air also enters the container, which makes it possible, inside the container, to compensate for the volume of product dispensed. The device may then be ready for a further use.

It will be apparent to those skilled in the art that various modifications and variations can be made to the dispensing member and method described herein. Other embodiments of the invention will be apparent to those skilled in the art. It is intended that the specification and examples be considered as exemplary only.

What is claimed is:

1. A dispensing member for a container, comprising:
   a body;
   a piston configured to slide inside the body, the piston being movable between a first position and a second position in response to pressure of a product exerted on the piston;
   variable volume chamber at least partially defined by the piston, the variable volume chamber being configured to communicate with a container, the first position of the piston maximizing a volume of the variable volume chamber and the second position of the piston minimizing the volume of the variable volume chamber, a difference between the maximum volume and the minimum volume comprising a first volume; and
   an outlet for passing product from the variable volume chamber while the piston moves from the first position to the second position,
   wherein the dispensing member is configured to dispense a first amount of product up to the first volume while the piston moves from the first position to the second position and, dependent on a manner in which pressure of a product is exerted on the piston, a second amount of product.

2. The dispensing member of claim 1, wherein the second amount of product includes an amount of product in a container in communication with the variable volume chamber.

3. The dispensing member of claim 1, wherein the dispensing member is configured such that the outlet is closed off when the piston is in the first position and the second position.

4. The dispensing member of claim 1, wherein the piston defines at least one passage configured to provide communication between a container and the variable volume chamber while the piston moves from the first position to the second position.

5. The dispensing member of claim 1, wherein the piston defines at least one passage configured to provide constant communication between a container and the variable volume chamber.

6. The dispensing member of claim 5, wherein the piston includes a peripheral edge and the body includes an inner surface, the peripheral edge and the inner surface of the body cooperating to define the at least one passage.

7. The dispensing member of claim 6, wherein the peripheral edge and the inner surface of the body cooperate to define a plurality of peripheral passages, and wherein the piston includes a plurality of ribs configured to guide movement of the piston in the body, the plurality of passages being separated by the plurality of ribs.

8. The dispensing member of claim 5, wherein the at least one passage traverses the piston from a first face of the piston to an opposite, second face of the piston being in communication with the variable volume chamber.

9. The dispensing member of claim 5, further comprising:
a plurality of passages traversing the piston, the plurality of passages being spaced from one another over first and second opposite faces of the piston.

10. The dispensing member of claim 1, wherein the piston is configured, while in the second position, to isolate the outlet of the variable volume chamber from a container.

11. The dispensing member of claim 1, further comprising:
elastic return means for returning the piston to the first position when the pressure of the product on the piston ceases.

12. The dispensing member of claim 11, wherein the elastic return means comprises a helical spring.

13. The dispensing member of claim 1, wherein the body includes an end wall, the outlet being substantially in a center part of the end wall.

14. The dispensing member of claim 1, wherein the outlet comprises a dispensing hole.

15. The dispensing member of claim 14, wherein the body includes an end wall facing the piston, the dispensing hole traversing the end wall and being spaced from the piston while the piston is in the second position.

16. The dispensing member of claim 15, further comprising:
an elastically deformable membrane associated with the dispensing hole, the elastically deformable membrane comprising at least one slot configured to be closed in the absence of sufficient pressure inside the dispensing member and to open in response to pressure exerted by product contained inside the variable volume chamber.

17. The dispensing member of claim 16, wherein the membrane is configured such that pressure exerted by the product contained in the variable volume chamber changes a profile of the membrane between a convex profile facing towards an outside of the dispensing member and a convex profile facing towards the inside of the dispensing member.

18. The dispensing member of claim 16, wherein the membrane is formed of a material chosen from thermoplastic elastomers, crosslinked elastomers, silicones, natural latexes, synthetic latexes, EPDMs, polyurethanes, mixtures of polypropylene and SIBS, mixtures of polypropylene and SEBS, mixtures of polypropylene and EPDM, very-low-density polyethylenes, mixtures based on polyester glycols (TPU), mixtures based on polyether glycols (PEBA and COPE), and flexible polyvinyl chlorides (PVC).

19. The dispensing member of claim 1, further comprising a stop limiting translation of the piston.

20. The dispensing member of claim 19, wherein the body includes an end wall, the stop extends from the end wall toward the piston.

21. The dispensing member of claim 19, wherein the body includes an inner wall and an end wall, the inner wall extending from the end wall and having a free end, the stop being associated with the free end.

22. The dispensing member of claim 1, wherein the dispensing member is configured to permit air to be taken inside the variable volume chamber via the outlet.

23. The dispensing member of claim 22, wherein the piston defines at least one passage configured to permit air to be taken inside a container via the outlet and the variable volume chamber.

24. A dispensing device comprising:
a container; and
the dispensing member of claim 1 associated with the container.

25. The dispensing device of claim 24, wherein the container comprises a container body having one end closed by a base and another end forming a neck with a free edge delimiting an opening, the dispensing member being fitted securely onto the neck.

26. The dispensing device of claim 24, wherein the container comprises at least one wall capable of being squeezed when squeezing pressure is exerted on the container and of returning to an initial shape when the squeezing pressure ceases.

27. The dispensing device of claim 24, further comprising a cosmetic product contained in the container.

28. The dispensing device of claim 27, wherein the product is chosen from a shampoo, a conditioner, a hair gel, a beauty-care cream, and beauty-care milk.

29. A method of dispensing and applying a cosmetic product, comprising:
providing the dispensing device of claim 27;
dispensing cosmetic product from the device, wherein the dispensing comprises passing the cosmetic product through the outlet; and
applying the cosmetic product to at least one of skin and hair.

30. The dispensing member of claim 1, wherein the dispensing member is configured such that the first amount of product and the second amount of product are dispensed when the piston moves a single time from the first position to the second position.

31. A method of dispensing a product, comprising:
providing an apparatus comprising a variable volume chamber defined, at least in part, by a movable piston;
flowing a product from a reservoir into the variable volume chamber;
moving the piston, in response to an increased pressure of the product, from a first position maximizing a volume of the variable volume chamber to a second position minimizing the volume of the variable volume chamber, a difference between the maximum volume and the minimum volume comprising a first volume; and
passing the product from the variable volume chamber via an outlet, wherein said passing the product comprises passing a first amount of product up to the first volume and, dependent on a manner in which pressure of a product is exerted on the piston, a second amount of product.

32. The method of claim 31, further comprising squeezing the reservoir to increase pressure of the product.

33. The method of claim 31, wherein said passing the product comprises changing a profile of a membrane associated with the outlet, in response to pressure of the product, from a convex profile facing towards an outside of the variable volume chamber to a convex profile facing towards the inside of the variable volume chamber.

34. A dispensing member for a container, comprising:
a body;
a piston configured to slide inside the body, the piston being movable between a first position and a second position;

a variable volume chamber at least partially defined by the piston, the first position of the piston maximizing a volume of the variable volume chamber and the second position of the piston minimizing the volume of the variable volume chamber, the piston being configured to provide constant communication between the variable volume chamber and a container while moving from the first position to the second position; and an outlet for passing product from the variable volume chamber while the piston moves from the first position to the second position.

35. The dispensing member of claim 34, wherein a difference between the maximum volume and the minimum volume comprises a first volume and the dispensing member is configured to dispense a first amount of product up to the first volume and, dependent on a manner in which pressure of a product is exerted on the piston, a second amount of product.

36. The dispensing member of claim 35, wherein the second amount of product includes an amount of product in a container in communication with the variable volume chamber.

37. The dispensing member of claim 34, wherein the dispensing member is configured such that the outlet is closed off when the piston is in the first position and the second position.

38. The dispensing member of claim 34, wherein the piston defines at least one passage configured to provide the constant communication between a container and the variable volume chamber.

39. The dispensing member of claim 38, wherein the piston includes a peripheral edge and the body includes an inner surface, the peripheral edge and the inner surface of the body cooperating to define the at least one peripheral passage.

40. The dispensing member of claim 39, wherein the peripheral edge and the inner surface of the body cooperate to define a plurality of peripheral passages, and wherein the piston includes a plurality of ribs configured to guide movement of the piston in the body, the plurality of passages being separated by the plurality of ribs.

41. The dispensing member of claim 38, wherein the at least one passage traverses the piston from a first face of the piston to an opposite, second face of the piston being in communication with the variable volume chamber.

42. The dispensing member of claim 38, further comprising:

a plurality of passages traversing the piston, the plurality of passages being spaced from one another over first and second opposite faces of the piston.

43. The dispensing member of claim 34, wherein the piston is configured, while in the second position, to isolate the outlet of the variable volume chamber from a container.

44. The dispensing member of claim 34, further comprising:

elastic return means for returning the piston to the first position when the pressure of the product on the piston ceases.

45. The dispensing member of claim 34, wherein the dispensing member is configured to permit air to be taken inside the variable volume chamber via the outlet.

46. The dispensing member of claim 45, wherein the piston defines at least one passage configured to permit air to be taken inside a container via the outlet and the variable volume chamber.

47. A dispensing device comprising:

a container; and the dispensing member of claim 34 associated with the container.

48. The dispensing device of claim 47, wherein the container comprises a container body having one end closed by a base and another end forming a neck with a free edge delimiting an opening, the dispensing member being fitted securely onto the neck.

49. The dispensing device of claim 47, wherein the container comprises at least one wall capable of being squeezed when squeezing pressure is exerted on the container and of returning to an initial shape when the squeezing pressure ceases.

50. The dispensing device of claim 47, further comprising a cosmetic product contained in the container.

51. The dispensing device of claim 50, wherein the product is chosen from a shampoo, a conditioner, a hair gel, a beauty-care cream, and beauty-care milk.

52. A method of dispensing and applying a cosmetic product, comprising:

providing the dispensing device of claim 50;

dispensing cosmetic product from the device, wherein the dispensing comprises passing the cosmetic product through the outlet; and applying the cosmetic product to at least one of skin and hair.

53. The dispensing member of claim 34, wherein the dispensing member is configured so that at least a first amount of product is dispensed while the piston moves from the first position to the second position.

54. A dispensing member comprising:

a body;

a piston configured to slide inside the body, the piston being movable between a first position and a second position;

a variable volume chamber at least partially defined by the piston, the variable volume chamber being configured to communicate with a container, the first position of the piston maximizing a volume of the variable volume chamber and the second position of the piston minimizing the volume of the variable volume chamber;

an outlet for passing product from the variable volume chamber;

a valving member associated with the outlet configured to close off the outlet while the piston is in the first position; and a sealing member associated with the outlet, the piston being configured to engage the sealing member and close off the outlet while in the second position.

55. The dispensing member of claim 54, wherein a difference between the maximum volume and the minimum volume comprises a first volume and the dispensing member is configured to dispense a first amount of product up to the first volume and, dependent on a manner in which pressure of a product is exerted on the piston, a second amount of product.

56. The dispensing member of claim 55, wherein the second amount of product includes an amount of product in a container in communication with the variable volume chamber.

57. The dispensing member of claim 54, wherein the piston defines at least one passage configured to provide constant communication between a container and the variable volume chamber.

58. The dispensing member of claim 57, wherein the piston includes a peripheral edge and the body includes an inner surface, the peripheral edge and the inner surface of the body cooperating to define at least one peripheral passage.

59. The dispensing member of claim 58, wherein the peripheral edge and the inner surface of the body cooperate to define a plurality of peripheral passages, and
wherein the piston includes a plurality of ribs configured to guide movement of the piston in the body, the plurality of passages being separated by the plurality of ribs.

60. The dispensing member of claim 57, wherein the at least one passage traverses the piston from a first face of the piston in communication with the container to an opposite, second face of the piston being in communication with the variable volume chamber.

61. The dispensing member of claim 57, further comprising:
a plurality of passages traversing the piston, the plurality of passages being spaced from one another over first and second opposite faces of the piston.

62. The dispensing member of claim 54, further comprising:
elastic return means for returning the piston to the first position when the pressure of the product on the piston ceases.

63. The dispensing member of claim 54, wherein the dispensing member is configured to permit air to be taken inside the variable volume chamber via the outlet.

64. The dispensing member of claim 63, wherein the piston defines at least one passage configured to permit air to be taken inside a container via the outlet and the variable volume chamber.

65. The dispensing member of claim 52, wherein the valving member comprises an elastically deformable membrane.

66. The dispensing member of claim 65, wherein the elastically deformable membrane comprises at least one slot configured to be closed in the absence of sufficient pressure inside the dispensing member and to open in response to pressure exerted by product contained inside the variable volume chamber.

67. The dispensing member of claim 65, wherein the membrane is configured such that pressure exerted by the product contained in the variable volume chamber changes a profile of the membrane between a convex profile facing towards an outside of the dispensing member and a convex profile facing towards the inside of the dispensing member.

68. A dispensing device comprising:
a container; and
the dispensing member of claim 54 associated with the container.

69. The dispensing device of claim 68, wherein the container comprises a container body having one end closed by a base and another end forming a neck with a free edge delimiting an opening, the dispensing member being fitted securely onto the neck.

70. The dispensing device of claim 68, wherein the container comprises at least one wall capable of being squeezed when squeezing pressure is exerted on the container and of returning to an initial shape when the squeezing pressure ceases.

71. The dispensing device of claim 68, further comprising a cosmetic product contained in the container.

72. The dispensing device of claim 71, wherein the product is chosen from a shampoo, a conditioner, a hair gel, a beauty-care cream, and beauty-care milk.

73. A method of dispensing and applying a cosmetic product, comprising:
providing the dispensing device of claim 71;
dispensing cosmetic product from the device, wherein the dispensing comprises passing the cosmetic product through the outlet; and
applying the cosmetic product to at least one of skin and hair.

74. A dispensing member for a container, comprising:
a body;
a piston configured to slide inside the body, the piston being movable between a first position and a second position in response to pressure of a product exerted on the piston;
a variable volume chamber at least partially defined by the piston, the variable volume chamber being configured to communicate with a container, the first position of the piston maximizing a volume of the variable volume chamber and the second position of the piston minimizing the volume of the variable volume chamber, a difference between the maximum volume and the minimum volume comprising a first volume; and
an outlet for passing product from the variable volume chamber while the piston moves from the first position to the second position,
wherein the dispensing member is configured to dispense an amount of product greater than the first volume while the piston moves from the first position to the second position.

75. The dispensing member of claim 74, wherein the second amount of product includes an amount of product in a container in communication with the variable volume chamber.

76. The dispensing member of claim 74, wherein the dispensing member is configured such that the outlet is closed off when the piston is in the first position and the second position.

77. The dispensing member of claim 74, wherein the piston defines at least one passage configured to provide communication between a container and the variable volume chamber while the piston moves from the first position to the second position.

78. The dispensing member of claim 74, wherein the piston defines at least one passage configured to provide constant communication between a container and the variable volume chamber.

79. The dispensing member of claim 78, wherein the piston includes a peripheral edge and the body includes an inner surface, the peripheral edge and the inner surface of the body cooperating to define the at least one passage.

80. The dispensing member of claim 79, wherein the peripheral edge and the inner surface of the body cooperate to define a plurality of peripheral passages, and
wherein the piston includes a plurality of ribs configured to guide movement of the piston in the body, the plurality of passages being separated by the plurality of ribs.

81. The dispensing member of claim 78, wherein the at least one passage traverses the piston from a first face of the piston to an opposite, second face of the piston being in communication with the variable volume chamber.

82. The dispensing member of claim 78, further comprising:
a plurality of passages traversing the piston, the plurality of passages being spaced from one another over first and second opposite faces of the piston.

83. The dispensing member of claim 74, wherein the piston is configured, while in the second position, to isolate the outlet of the variable volume chamber from a container.

84. The dispensing member of claim 74, further comprising:
elastic return means for returning the piston to the first position when the pressure of the product on the piston ceases.

85. The dispensing member of claim 84, wherein the elastic return means comprises a helical spring.

86. The dispensing member of claim 74, wherein the body includes an end wall, the outlet being substantially in a center part of the end wall.

87. The dispensing member of claim 74, wherein the outlet comprises a dispensing hole.

88. The dispensing member of claim 87, wherein the body includes an end wall facing the piston, the dispensing hole traversing the end wall and being spaced from the piston while the piston is in the second position.

89. The dispensing member of claim 88, further comprising:
an elastically deformable membrane associated with the dispensing hole, the elastically deformable membrane comprising at least one slot configured to be closed in the absence of sufficient pressure inside the dispensing member and to open in response to pressure exerted by product contained inside the variable volume chamber.

90. The dispensing member of claim 89, wherein the membrane is configured such that pressure exerted by the product contained in the variable volume chamber changes a profile of the membrane between a convex profile facing towards an outside of the dispensing member and a convex profile facing towards the inside of the dispensing member.

91. The dispensing member of claim 89, wherein the membrane is formed of a material chosen from thermoplastic elastomers, crosslinked elastomers, silicones, natural latexes, synthetic latexes, EPDMs, polyurethanes, mixtures of polypropylene and SIBS, mixtures of polypropylene and SEBS, mixtures of polypropylene and EPDM, very-low-density polyethylenes, mixtures based on polyester glycols (TPU), mixtures based on polyether glycols (PEBA and COPE), and flexible polyvinyl chlorides (PVC).

92. The dispensing member of claim 74, further comprising a stop limiting translation of the piston.

93. The dispensing member of claim 92, wherein the body includes an end wall, the stop extends from the end wall toward the piston.

94. The dispensing member of claim 92, wherein the body includes an inner wall and an end wall, the inner wall extending from the end wall and having a free end, the stop being associated with the free end.

95. The dispensing member of claim 74, wherein the dispensing member is configured to permit air to be taken inside the variable volume chamber via the outlet.

96. The dispensing member of claim 95, wherein the piston defines at least one passage configured to permit air to be taken inside a container via the outlet and the variable volume chamber.

97. A dispensing device comprising:
a container; and
the dispensing member of claim 74 associated with the container.

98. The dispensing device of claim 97, wherein the container comprises a container body having one end closed by a base and another end forming a neck with a free edge delimiting an opening, the dispensing member being fitted securely onto the neck.

99. The dispensing device of claim 97, wherein the container comprises at least one wall capable of being squeezed when squeezing pressure is exerted on the container and of returning to an initial shape when the squeezing pressure ceases.

100. The dispensing device of claim 97, further comprising a cosmetic product contained in the container.

101. The dispensing device of claim 100, wherein the product is chosen from a shampoo, a conditioner, a hair gel, a beauty-care cream, and beauty-care milk.

102. A method of dispensing and applying a cosmetic product, comprising:
providing the dispensing device of claim 100;
dispensing cosmetic product from the device, wherein the dispensing comprises passing the cosmetic product through the outlet; and
applying the cosmetic product to at least one of skin and hair.

103. The dispensing member of claim 74, wherein the dispensing member is configured such that the dispensed amount of product is dispensed when the piston moves a single time from the first position to the second position.

104. A dispensing member for a container, comprising:
a body;
a piston configured to slide inside the body, the piston being movable between a first position and a second position in response to pressure of a product exerted on the piston;
a variable volume chamber at least partially defined by the piston, the variable volume chamber being configured to communicate with a container, the first position of the piston maximizing a volume of the variable volume chamber and the second position of the piston minimizing the volume of the variable volume chamber, a difference between the maximum volume and the minimum volume comprising a first volume; and
an outlet for passing product from the variable volume chamber while the piston moves from the first position to the second position,
wherein the dispensing member is configured to dispense a first amount of product up to the first volume and, dependent on a manner in which pressure of a product is exerted on the piston, a second amount of product, and wherein the dispensing member is configured such that the outlet is closed off when the piston is in the first position and the second position.

105. A dispensing member for a container, comprising:

a body;

a piston configured to slide inside the body, the piston being movable between a first position and a second position in response to pressure of a product exerted on the piston;

elastic return means for returning the piston to the first position when the pressure of the product on the piston ceases;

a variable volume chamber at least partially defined by the piston, the variable volume chamber being configured to communicate with a container, the first position of the piston maximizing a volume of the variable volume chamber and the second position of the piston minimizing the volume of the variable volume chamber, a difference between the maximum volume and the minimum volume comprising a first volume; and an outlet for passing product from the variable volume chamber while the piston moves from the first position to the second position, wherein the dispensing member is configured to dispense a first amount of product up to the first volume and, dependent on a manner in which pressure of a product is exerted on the piston, a second amount of product.

* * * * *

UNITED STATES PATENT AND TRADEMARK OFFICE
CERTIFICATE OF CORRECTION

PATENT NO.     : 6,415,961 B2                                               Page 1 of 1
DATED          : July 9, 2002
INVENTOR(S)    : Philippe Bonningue It is certified that error appears in the above-identified patent and that said Letters Patent is hereby corrected as shown below:

<u>Column 10,</u>
Line 26, before "variable volume chamber", insert -- a --.

<u>Column 15,</u>
Line 37, "claim 52" should read -- claim 54 --.

Signed and Sealed this

Twenty-ninth Day of October, 2002

Attest:

Attesting Officer

JAMES E. ROGAN
Director of the United States Patent and Trademark Office